US009810139B2

(12) United States Patent
Gruber et al.

(10) Patent No.: US 9,810,139 B2
(45) Date of Patent: Nov. 7, 2017

(54) METHOD FOR OPERATING A COMPRESSION IGNITION ENGINE

(71) Applicant: GE Jenbacher GmbH & Co OG, Jenbach (AT)

(72) Inventors: Friedrich Gruber, Hippach (AT); Nikolaus Spyra, Innsbruck (AT); Christian Trapp, Hall in Tirol (AT); Georg Tinschmann, Schwaz (AT); Ettore Musu, Modena (IT); Peter Christiner, Graz (AT)

(73) Assignee: GE Jenbacher GMBH & CO OG, Jenbach (AT)

( * ) Notice: Subject to any disclaimer, the term of this patent is extended or adjusted under 35 U.S.C. 154(b) by 0 days.

(21) Appl. No.: 14/873,621

(22) Filed: Oct. 2, 2015

(65) Prior Publication Data
US 2016/0097316 A1   Apr. 7, 2016

(30) Foreign Application Priority Data

Oct. 6, 2014   (AT) .............................. A 50715/2014

(51) Int. Cl.
*F02B 7/08*   (2006.01)
*F02D 13/02*   (2006.01)
(Continued)

(52) U.S. Cl.
CPC .............. *F02B 7/08* (2013.01); *F02D 13/0207* (2013.01); *F02D 13/0265* (2013.01);
(Continued)

(58) Field of Classification Search
CPC .......... F02B 7/06; F02B 7/08; F02D 19/0642; F02D 19/0644; F02D 19/0647;
(Continued)

(56) References Cited

U.S. PATENT DOCUMENTS 5,426,934 A * 6/1995 Hunt .................. B01D 53/9495
                                                              123/688
5,452,576 A * 9/1995 Hamburg ............ F02D 41/1441
                                                              60/274

(Continued)

FOREIGN PATENT DOCUMENTS

DE   10 2009 029 586   3/2011
DE   10 2011 089 292   6/2013
(Continued)

OTHER PUBLICATIONS

Austrian Search Report dated Feb. 27, 2015 in corresponding Austrian Patent Application No. 50715/2014 (with English translation).

(Continued)

*Primary Examiner* — Sizo Vilakazi
*Assistant Examiner* — Kevin R Steckbauer
(74) *Attorney, Agent, or Firm* — GE Global Patent Operation

(57) ABSTRACT

A method for operating a compression ignition engine includes forming a combustible mixture by mixing generally homogeneously a first fuel and air and introducing this mixture into the at least one cylinder, compressing the combustible mixture with the piston in a compression stroke, injecting a second fuel to the combustible mixture at an injection-time of the second fuel during the compression stroke but before start of combustion, and continuing the compression stroke until combustion starts at those locations in the at least one cylinder where concentration of the second fuel is highest and/or the temperature of the mixture is the highest. Emission of the cylinder and/or mechanical stress of the cylinder caused by the combustion are monitored, and if emissions and/or mechanical stress are above respective predetermined thresholds, individually for the cylinder, the (Continued)

amount and/or the timing of the second fuel injected, and/or temperature of the cylinder charge is changed.

20 Claims, 3 Drawing Sheets

(51) Int. Cl.
    *F02D 19/10*     (2006.01)
    *F02D 41/00*     (2006.01)
    *F02D 41/14*     (2006.01)
    *F02D 41/30*     (2006.01)
    *F02D 35/02*     (2006.01)
    *F02D 19/06*     (2006.01)

(52) U.S. Cl.
    CPC ....... *F02D 13/0273* (2013.01); *F02D 19/061* (2013.01); *F02D 19/10* (2013.01); *F02D 35/023* (2013.01); *F02D 35/028* (2013.01); *F02D 41/005* (2013.01); *F02D 41/006* (2013.01); *F02D 41/008* (2013.01); *F02D 41/0025* (2013.01); *F02D 41/0027* (2013.01); *F02D 41/1443* (2013.01); *F02D 41/1459* (2013.01); *F02D 41/1462* (2013.01); *F02D 41/1497* (2013.01); *F02D 41/3047* (2013.01); *F02D 19/0642* (2013.01); *F02D 19/0689* (2013.01); *F02D 2250/36* (2013.01); *Y02T 10/18* (2013.01); *Y02T 10/36* (2013.01); *Y02T 10/47* (2013.01)

(58) Field of Classification Search
    CPC .. F02D 19/10; F02D 41/3047; F02D 41/1443; F02D 41/1459
    See application file for complete search history.

(56) References Cited

U.S. PATENT DOCUMENTS

| | | | |
|---|---|---|---|
| 6,095,102 A * | 8/2000 | Willi | F02D 19/10 123/27 GE |
| 6,230,683 B1 | 5/2001 | zur Loye et al. | |
| 6,463,907 B1 | 10/2002 | Hiltner | |
| 6,659,071 B2 | 12/2003 | LaPointe et al. | |
| 6,968,679 B2 * | 11/2005 | Pott | F02D 37/00 204/424 |
| 6,983,732 B2 * | 1/2006 | Kuo | F02D 13/0242 123/299 |
| 7,742,868 B2 * | 6/2010 | Kang | F02D 13/0265 123/299 |
| 8,478,506 B2 * | 7/2013 | Grichnik | B60W 40/00 701/102 |
| 8,588,999 B2 * | 11/2013 | Hall | B60L 11/123 123/445 |
| 8,839,605 B2 * | 9/2014 | Gonze | B01D 53/9468 60/276 |
| 8,883,102 B1 * | 11/2014 | Lambert | B01D 53/9495 423/213.2 |
| 8,925,305 B2 * | 1/2015 | Shinoda | F01N 3/2073 60/286 |
| 9,194,322 B2 * | 11/2015 | Shimada | F02D 41/30 |
| 9,249,744 B2 * | 2/2016 | Klingbeil | F02D 19/061 |
| 2001/0017127 A1 * | 8/2001 | Flynn | F02B 1/12 123/435 |
| 2003/0200955 A1 | 10/2003 | Zur Loye et al. | |
| 2004/0045278 A1 * | 3/2004 | Pott | F02D 37/00 60/274 |
| 2005/0121008 A1 | 6/2005 | Kilkenny et al. | |
| 2006/0059895 A1 * | 3/2006 | Pott | F02D 37/00 60/285 |
| 2006/0288979 A1 | 12/2006 | Ancimer et al. | |
| 2008/0201054 A1 * | 8/2008 | Grichnik | B60W 40/00 701/102 |
| 2011/0288744 A1 | 11/2011 | Gokhale et al. | |
| 2012/0022728 A1 * | 1/2012 | Hall | B60L 11/123 701/19 |
| 2013/0152900 A1 | 6/2013 | Masubuchi | |
| 2013/0325295 A1 * | 12/2013 | Klingbeil | F02D 19/061 701/104 |
| 2015/0078975 A1 * | 3/2015 | Mahakul | F01N 3/0814 423/212 |
| 2016/0025024 A1 * | 1/2016 | Huber | F02D 19/023 123/704 |

FOREIGN PATENT DOCUMENTS

| | | |
|---|---|---|
| EP | 1 689 990 | 8/2006 |
| JP | 11-336600 | 12/1999 |
| JP | 2005-201240 | 7/2005 |
| JP | 2007-107486 | 4/2007 |
| JP | 3913785 | 5/2007 |
| JP | 2011-140882 | 7/2011 |
| JP | 2012-57470 | 3/2012 |
| WO | 98/07973 | 2/1998 |
| WO | 2005/059336 | 6/2005 |

OTHER PUBLICATIONS

European Search Report issued Feb. 29, 2016 in corresponding European Patent Application No. 15002783 (with English translation).
Greve, Martin, "NO$_x$ Control with Cylinder Pressure Based Engine Control Systems," Motortechnische Zeitscgrift MTZ, No. 2014/09, Sep. 1, 2014, pp. 44-53.
Serrano et al., David, "Exploring the Potential of Dual Fuel Diesel-CNG Combustion for Passenger Car Engine," Lecture Notes in Electrical Engineering, Springer, Germany, vol. 191, Nov. 27, 2012, pp. 139-153.

\* cited by examiner

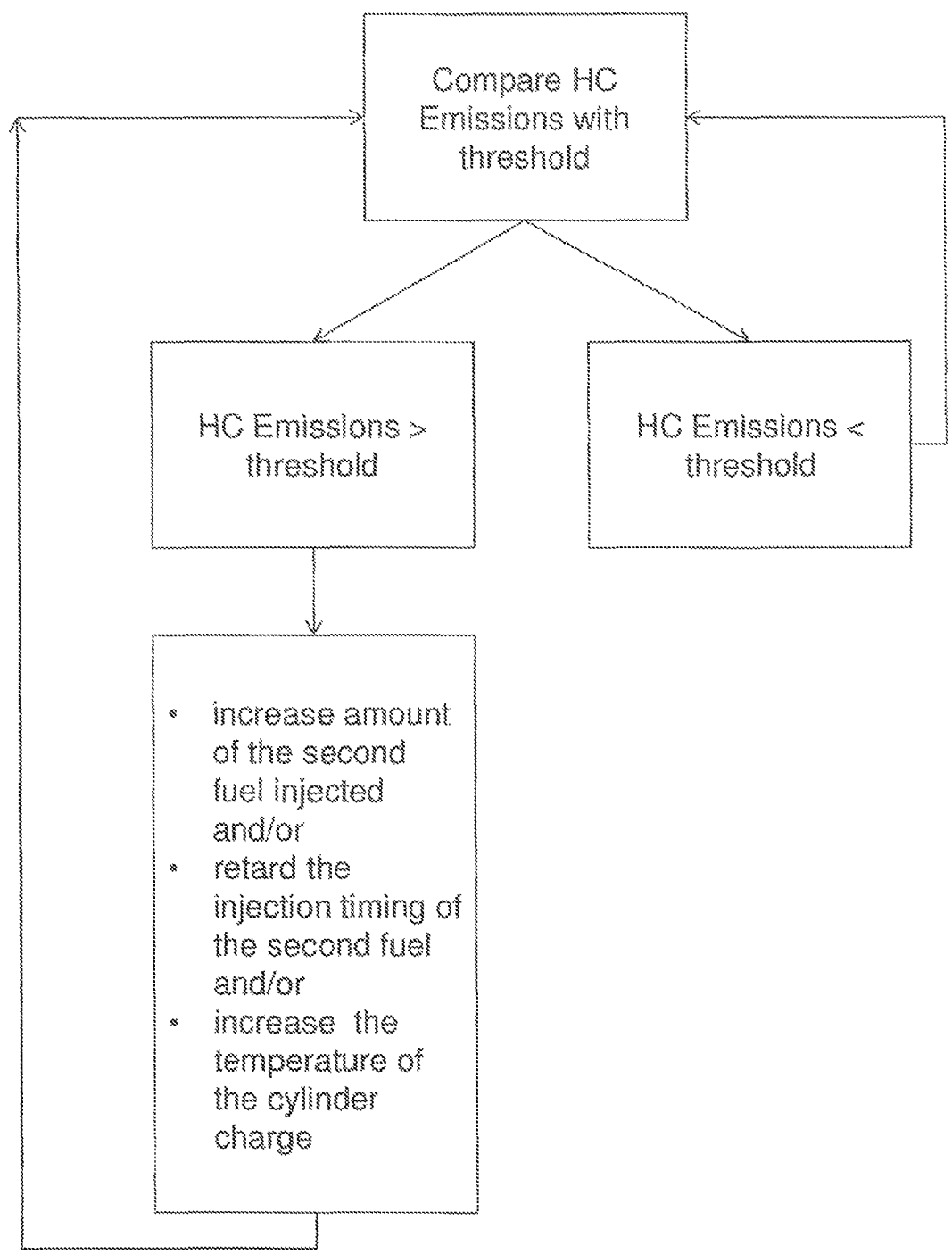

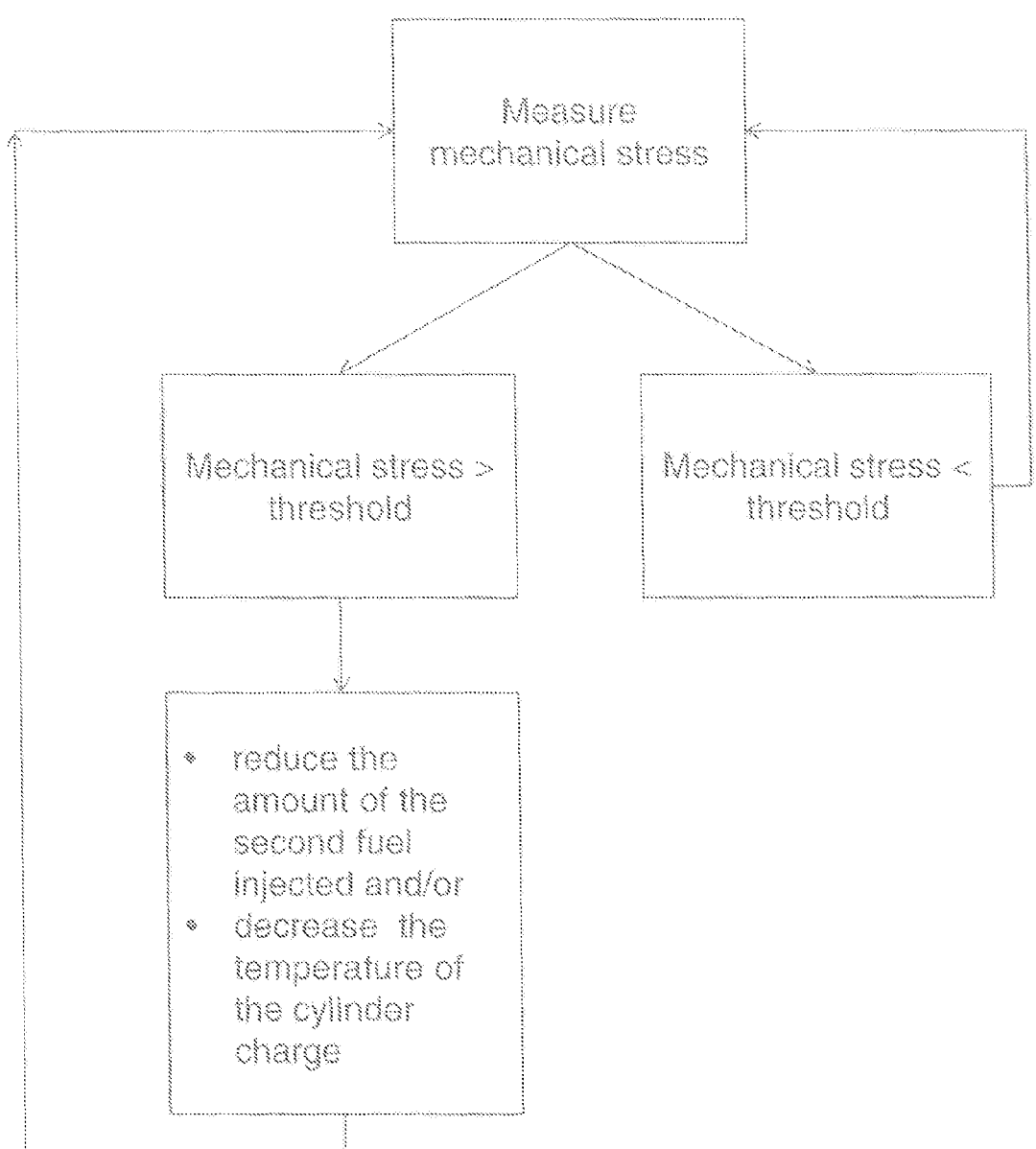

METHOD FOR OPERATING A COMPRESSION IGNITION ENGINE

BACKGROUND OF THE INVENTION

The present invention is directed to a method for operating a compression ignition engine, and a compression ignition engine itself.

When designing internal combustion engines, there are conflicting requirements between the reduction of different types of emissions like nitrogen oxides (NOx), unburnt hydrocarbons (HC), carbon monoxide (CO) and the reduction of particulate matters (PM). A promising approach to realize highly efficient and low emission combustion is the HCCI-concept (homogeneous charge compression ignition). Here, the ignition of a highly diluted (lean and/or with high rate of exhaust recirculation, EGR) and homogeneous fuel-air-mixture is effected through the temperature increase during the compression stroke close to the upper dead center of the piston. The very dilute fuel-air-mixture allows combustion with extremely low values for nitrogen oxides (NOx).

Auto-ignition of the fuel-air-mixture in the combustion chamber is achieved through a combination of various measures, such as a high geometric compression ratio $\epsilon$ and pre-heating of the charge through suitable measures (for example, pre-heating of the intake air or exhaust gas recirculation, EGR). As according to the HCCI combustion concept the fuel-air-mixture ignites more or less simultaneously in the whole combustion chamber close to top dead center, the combustion event is extremely rapid.

In Diesel-engines, the ignition timing can be easily controlled by the injection time. The control of the ignition time in a HCCI-engine is very demanding.

It is known from the art to ignite the lean and homogeneous fuel-air-mixture through injection of a small amount of a second fuel which tends to autoignite earlier than the first fuel. The choice of start of injection of this secondary fuel can take into account the actual operating condition of the engine. With increasing load of the engine, the amount of the secondary fuel is adjusted.

This concept is known as dual fuel combustion. If the second fuel is injected early and partly pre-mixed for low emissions, this concept is known as dual fuel PCCI or RCCI combustion. If the second fuel is injected in a way that both fuels are mixed homogenously, the concept is known as dual-fuel-HCCI.

The combination of two fuels with different auto-ignition properties allows a much better control of the combustion process. Without such second fuel with different auto-ignition properties, the ignition time can be adjusted through the EGR-rate, that is the percentage amount of recirculated exhaust gas. However, the variation of the external EGR-rate is not a measure with rapid effect, but shows a delayed response.

All known PCCI, HCCI, and RCCI and dual fuel concepts are associated with high HC and CO emissions, as it is well known from literature.

U.S. Pat. No. 6,659,071 shows an internal combustion engine, which can be operated in a PCCI (premixed charged compression ignition) mode. A mixing device forms a mixture of a first fuel with the intake air, a fuel injection device which is capable of injecting a second fuel directly into the combustion chamber, and a control system which controls the injection of the second fuel in such manner. Prior to auto-ignition through the compression of the charge, at least one "control injection" takes place. According to U.S. Pat. No. 6,659,071 it can be foreseen that the main fuel is natural gas and the second fuel is Diesel.

From WO 98/07973 a method to control a PCCI-engine is known, wherein the control of the combustion progress is conducted through measuring an operating state of the engine, which is indicative for the combustion progress. In order to control the start of combustion precisely, the temperature, the pressure, the equivalence ratio and or the auto-ignition properties of the fuel-air-mixture are controlled. Control of the start of ignition and the velocity of ignition is started in such way that basically the complete combustion event takes place within certain crank angle limits, in particular between 20° before the upper dead center through 35° after the upper dead center. This is based on the fact, that the point in time for the beginning of the ignition and the velocity of combustion in a PCCI-engine are depending on the course of temperature, the course of pressure, the auto-ignition properties of the fuel, for example the octane or methane number or the activation energy and the composition of the charge air in cylinder (oxygen content, EGR, moisture, equivalence ratio etc).

U.S. Pat. No. 6,463,907 shows a HCCI-engine and a method to operate such engine, wherein through addition of a secondary fuel, preferably Diesel, the center of combustion is tuned to the preferred crank angle. The desired combustion delay hereby is independent from the combustion duration of the main fuel mixture, which in turn is defined by the EGR rate in connection with the air to fuel ratio. Through the addition of the secondary fuel, the crank angle range, in which combustion takes place, now can be held constant through a wide range of engine speeds. Because of the relatively low burn rates of natural gas after ignition, relatively low EGR rates and high boost pressures are used. Power and speed of subject HCCI-engine are controlled through the air-fuel-mixture or boost pressure.

Also known are approaches to define the ignition timing through the external EGR rate. At high rates of recirculated exhaust gas, the burn rate is slowed down because of the reduced oxygen content.

The control strategy for dual-fuel HCCI engines according to U.S. Pat. No. 6,463,907 is to effect the timing of the spontaneous ignition (auto-ignition) through injection of a fuel with high cetane number, typically diesel, prior to or early in the compression phase. The amount of fuel with a high cetane number added depends on the engine speed and power, and is chosen such that the ignition time is tuned to a suitable crank angle position. The combustion duration is controlled independently through the EGR rate.

To summarize, the conditions for auto-ignition of a lean homogeneous fuel-air-mixture according to the state of the art are controlled by high EGR rates, cooling of the recirculated exhaust, and high geometric compression ratios.

SUMMARY OF THE INVENTION

However, concepts shown the in prior art do not keep both emissions and mechanical stresses below certain thresholds. Thus, the objective of the present invention is to keep emissions and mechanical stresses under control.

Although in the following discussion only one injection event of the second fuel is being discussed, it should be understood that there might be two or more injection events of the second fuel. In case there is more than one injection event, the following action can be taken with respect to only one, multiple or all of them together.

With respect to gases all numbers given in % relate to volume percentage.

The first fuel can be natural gas or a mixture of natural gas and CO2 such that the amount of CO2 and CH4 is higher than 80% of the volume of the first fuel.

The second fuel can be a fuel having a cetane number between 30 and 70, preferably between 40 and 60. One example is a Diesel fuel.

Emission of the at least one cylinder and/or mechanical stress of the at least one cylinder caused by the combustion are monitored. If emissions and/or mechanical stress are above respective predetermined thresholds, individually for the at least one cylinder, the following is changed:
- the amount and/or the timing of the second fuel injected, and/or
- temperature of the cylinder charge.

The change is made such that emissions and/or mechanical stress go down below their respective predetermined thresholds. As a result, one can much better operate the combustion engine at different ambient conditions as for example ambient temperature, humidity, altitude at which the engine is being operated.

Also with regard to mechanical tolerances—that are necessarily present with an internal combustion engine—by the present method, one can much better compensate variations between individual cylinders present with respect to individual fuel injectors, compression ratio, gas exchange, deposits, etc.

If fuel quality changes, the inventive concept can compensate those changes, too.

Monitoring emission of the at least one cylinder and/or mechanical stress of the at least one cylinder caused by the combustion can be carried out by measuring signals characteristic for the combustion event in the at least one cylinder. It is not required to measure emissions directly but use combustion characteristics instead.

This measurement could be done in various ways:

For example, the step of measuring signals characteristic for the combustion event in the at least one cylinder comprises determining a characteristic position in time of the combustion event and/or duration of the combustion event. Such characteristic position in time of the combustion could be, for example, the center of gravity of combustion. Typically, center of gravity and combustion duration are acquired by means of in-cylinder pressure measurement. However, alternative approaches are ion-current measurements or optical approaches.

Duration of combustion, also "burn duration" is a measure of the burn progress in a combustion cycle, expressed as mass fraction burned during a certain crank angle. For example, the burn duration of $\Delta\theta_{0-10\%}$ of 15° crank angle means that 10% of the charge mass has burned during 15° crank angle revolution. The combustion center of gravity indicates the state in which half of the fresh charge is burned. It is also known as MFB50, i.e. 50% mass fraction burned. The terms can be found in textbooks on internal combustion engines, see in particular Heywood, John B., Internal Combustion Engine Fundamentals, New York, McGraw-Hill, 1988.

The step of changing the amount of the second fuel injected can comprise reducing the amount of the second fuel if the mechanical stress is too high. By reducing the amount of the second fuel, the combustion is delayed so that the peak firing pressure is reduced, thus reducing the mechanical stresses to the engine. The step of changing the temperature of the cylinder charge can also comprise lowering the temperature of the cylinder charge if the mechanical stress is too high.

This can for instance be achieved through lowering the intake temperature of first fuel and air. Alternatively, or additionally, if the engine is equipped with a variable valve train, capable of varying individually with respect to the at least one cylinder the exhaust and/or intake valve timing and/or valve lift curves, the step of changing the temperature of the cylinder charge can be effected by way of the variable valve train—preferably by closing the exhaust valve earlier to increase the temperature of the cylinder charge or closing the exhaust valve later to decrease temperature of the cylinder charge, respectively. Besides the actuating times, lift curves can also possibly be controlled in a variable valve train. The lift curve describes the respective position of the valves relative to closed state in terms of crank angle. By changing valve lift curves, the residual amounts of exhaust gas can be modulated in a very beneficial way. When the exhaust valves re-open or are kept open during the intake phase, exhaust gases flow back to the cylinder, thus increasing the cylinder charge temperature. As another example, if the intake valves are opening also during the exhaust stroke, exhaust gases flow into the intake system, thus increasing the charge temperature in the intake. Consequently, when the intake valve are then opened during the regular intake process, the charge temperature is increased.

Further, the step of changing the temperature of the cylinder charge can be affected by way of the variable valve train by re-opening an already closed exhaust valve in the intake stroke of the piston thereby increasing the temperature of the cylinder charge. This has the particular advantage that the in-cylinder charge temperature can be controlled cylinder-individually. It is further beneficial that the valve timing can be changed on a cycle to cycle basis, that is, the control response is very rapid.

As a further alternative, the step of changing the temperature of the cylinder charge can be affected by way of the variable valve train by re-opening a closed intake valve during the exhaust stroke of the piston, thereby increasing the temperature of the cylinder charge.

By changing the valve timing, the amounts of residual exhaust gases in the cylinders are changed, thus the rate of internal EGR is varied. Since the residual exhaust gas temperature is very high, this measure is very effective to increase the charge temperature.

Further, the step of changing the temperature of the cylinder charge can be affected by an additional injection of the second fuel and combustion in the gas exchange TDC while the intake and exhaust valves are closed (negative valve overlap). Increasing the amount of second fuel combusted during negative valve overlap increases the temperature of the cylinder charge, and decreasing the amount of second fuel combusted during negative valve overlap decreases the temperature of the cylinder charge.

With regard to emissions, the step of monitoring emission of the at least one cylinder can comprise differentiating between NOx and HC emissions.

This differentiation is done through monitoring combustion characteristics, decisive for the formation of the specific emission species. That is, for example, at a given lambda, mixture homogeneity and given EGR rate, the NOx emissions largely depend on the combustion position, that is the center of gravity. The earlier the center of gravity is (expressed as crank angle) the higher the NOx formation, the later the combustion position the lower the NOx formation.

NOx formation is also effected by the combustion speed, expressed as combustion duration (e.g. the crank angle value for $\Delta\theta_{10-90\%}$). The relationship is such that a high combustion speed (small $\Delta\theta$) results in higher NOx, while a slower combustion speed results in lower NOx. This is because in case of high combustion speeds, the majority of the combustion takes place close to TDC, and therefore at relatively high temperatures. As the temperature is the governing parameter for NOx formation, this results in high NOx values for high combustion speeds. For HC emission, the following characteristics are relevant for their formation:

the higher the combustion temperature, the lower the HC formation. That is, for HC emissions, the relationship to combustion parameters given above is just opposite to the relationship for NOx formation.

Therefore, if NOx emissions are too high, the amount of the second fuel injected can be reduced and/or the injection timing of the second fuel can be advanced and/or the temperature of the cylinder charge can be decreased.

As the amount of second fuel determines the cylinder charge temperature after ignition of the second fuel, the amount of second fuel also influences NOx formation. Wherein reducing the amount of second fuel affects a lower charge temperature, thus lower NOx formation. Further, by lowering the fuel concentration in the cylinder by reducing the amount of second fuel, the NOx formation is reduced as higher fuel concentrations generally promote NOx formation.

In turn, if HC emissions are too high, the amount of the second fuel injected is increased and/or the injection timing of the second fuel is retarded and/or the temperature of the cylinder charge is increased. The temperature of the cylinder charge can be increased, for example, by using either external and/or internal EGR. Alternatively or in addition, the air temperature could be increased.

That is, if NOx emissions are too high, the amount of the second fuel injected is reduced and/or the injection timing of the second fuel is advanced and/or the temperature of the cylinder charge is decreased.

BRIEF DESCRIPTION OF THE DRAWINGS

Other objects and advantages of the invention will become apparent in light of the accompanying drawings, wherein:

FIG. 1b is a flow chart of the control logic regarding HC emissions

FIG. 2 is a flow chart of the control logic regarding mechanical stress.

DETAILED DESCRIPTION OF THE INVENTION

Figure 1A:
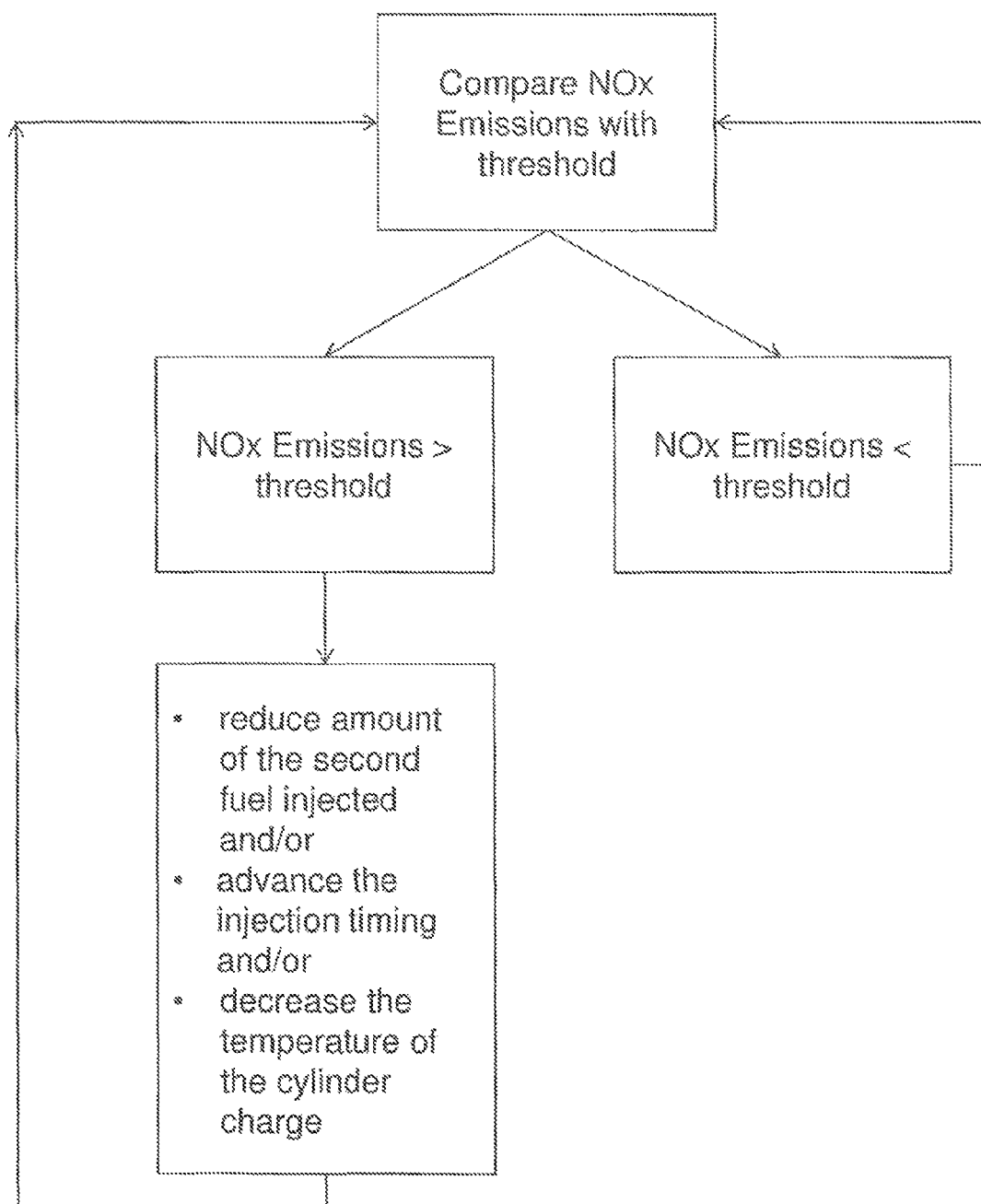
FIG. 1a is a flow chart of the control logic regarding NOx emissions

FIG. 1a shows a flow chart of the control logic regarding NOx emissions. In a first step, the current NOx emissions are compared with a predetermined threshold. If the NOx emissions do not exceed the predetermined threshold, the loop goes back to start.

If the NOx emissions do exceed the predetermined threshold (left side of the flow chart), the following measures are carried out to counter the NOx emissions:

reduce amount of the second fuel injected and/or
advance the injection timing and/or
decrease the temperature of the cylinder charge
After execution of the above measures, the loop goes back to the comparison of NOx emissions with a predetermined threshold.

Similarly, FIG. 1b shows a flow chart of the control logic regarding Hydrocarbon (HC) emissions. In a first step the current HC emissions are compared with a predetermined threshold. If the HC emissions do not exceed the predetermined threshold the loop goes back to start.

If the HC emissions do exceed the predetermined threshold (left side of the flow chart), the following measures are carried out to counter the HC emissions:

increase amount of the second fuel injected and/or
retard the injection timing of the second fuel and/or
increase the temperature of the cylinder charge
After execution of above measures, the loop goes back to the comparison of HC emissions with a predetermined threshold.

FIG. 2 shows a flow chart of the control logic regarding the mechanical loads (stress) on the engine. Signals characteristic for the mechanical stress are being determined by suitable sensors (not shown here). The values indicative of mechanical stress are compared to a predetermined threshold for mechanical stress. If the values for mechanical stress are below the threshold the loop goes back to start.

If the values for mechanical stress exceed the predetermined threshold, the following measures are carried out to reduce the mechanical stresses:

reduce the amount of the second fuel injected and/or
decrease the temperature of the cylinder charge
After execution of above measures, the loop goes back to the comparison of values for mechanical stress to a predetermined threshold.

The invention claimed is:

1. A method of operating a compression ignition engine, the engine having a cylinder and a piston movable in the cylinder, said method comprising:
    forming a combustible mixture by mixing substantially homogeneously a first fuel and air, and introducing the combustible mixture of the first fuel and air into the cylinder;
    compressing the combustible mixture with the piston in a compression stroke;
    injecting a second fuel into the combustible mixture at an injection-time of the second fuel during the compression stroke but before start of combustion to create a cylinder charge, the second fuel being capable of auto-igniting earlier than the first fuel;
    continuing the compression stroke until combustion starts in the cylinder at locations where at least one of (i) concentration of the second fuel is highest and (ii) temperature of the combustible mixture is the highest;
    monitoring emissions of the cylinder caused by the combustion by differentiating between NOx and HC emissions; and
    if said monitoring determines that HC emissions are above a predetermined HC emissions threshold value individually for the cylinder, then performing:
        increasing an amount of the second fuel injected;
        retarding an injection timing of the second fuel; and
        increasing a temperature of the cylinder charge.

2. The method according to claim 1, wherein the first fuel is natural gas or a mixture of natural gas and CO2 such that an amount of CO2 and CH4 is greater than 80% of a total amount of the first fuel.

3. The method according to claim 1, wherein the second fuel has a cetane number between 30 and 70.

4. The method according to claim 3, wherein the second fuel has a cetane number between 40 and 60.

5. The method according to claim 1, further comprising monitoring mechanical stress of the cylinder caused by the combustion; and if mechanical stress is above a respective threshold value individually for the cylinder, then performing at least one of:

changing the amount of the second fuel injected;

changing the injection timing of the second fuel; and changing the temperature of the cylinder charge, such that mechanical stress goes down below the respective predetermined thresholds.

6. The method according to claim 5, wherein at least one of said monitoring emissions of the cylinder and said monitoring mechanical stress of the cylinder comprises measuring signals characteristic for the combustion in the cylinder.

7. The method according to claim 5, wherein said changing the temperature of the cylinder charge, if performed, comprises lowering the temperature of the cylinder charge.

8. The method according to claim 7, wherein said lowering the temperature of the cylinder charge, if performed, comprises lowering an intake temperature of the first fuel and air.

9. The method according to claim 1, further comprising monitoring mechanical stress of the cylinder caused by the combustion, wherein at least one of said monitoring emissions of the cylinder and said monitoring mechanical stress of the cylinder comprises measuring signals characteristic for the combustion in the cylinder.

10. The method according to claim 1, wherein at least one of said monitoring emissions of the cylinder and said monitoring mechanical stress of the cylinder comprises measuring signals characteristic for the combustion in the cylinder, said measuring signals characteristic for the combustion in the cylinder comprises determining at least one of (i) a characteristic position in time of the combustion event and (ii) a duration of the combustion event.

11. The method according to claim 5, wherein said changing the amount of the second fuel injected, if performed, comprises reducing the amount of the second fuel.

12. The method according to claim 1, further comprising controlling an in-cylinder temperature by an internal EGR-rate kept in a combustion chamber during a gas exchange process or by an external EGR rate recirculated in the intake system.

13. The method according to claim 1, wherein the engine comprises a variable valve train configured to individually vary at least one of (i) an exhaust/intake valve timing and (ii) valve lift curves with respect to the cylinder.

14. The method according to claim 13, wherein said increasing the temperature of the cylinder charge is performed by the variable valve train by closing an exhaust valve to increase the internal EGR and thereby increase the temperature of the cylinder charge.

15. The method according to claim 14, wherein increasing the temperature of the cylinder charge is performed by the variable valve train by re-opening a closed exhaust valve in an intake phase of the piston to thereby increase the temperature of the cylinder charge.

16. The method according to claim 13, wherein increasing the temperature of the cylinder charge is performed by the variable valve train by re-opening a closed exhaust valve in an intake phase of the piston to thereby increase the temperature of the cylinder charge.

17. The method according to claim 13, wherein increasing the temperature of the cylinder charge is performed by the variable valve train by re-opening a closed intake valve during an exhaust stroke of the piston thereby increasing the temperature of the cylinder charge.

18. The method according to claim 1, wherein said increasing the temperature of the cylinder charge comprises increasing the back-pressure to increase the temperature of the cylinder charge.

19. The method according to claim 1, wherein said increasing the temperature of the cylinder charge comprises an additional injection of the second fuel and combustion at TDC between an exhaust stroke and an intake stroke while the intake valve and exhaust valves are closed.

20. A compression ignition engine comprising:

a cylinder;

a piston moveable in said cylinder;

an injector to inject the second fuel; and an electronic control unit configured to perform the method according to claim 1.

* * * * *